United States Patent
Hattori et al.

(10) Patent No.: US 8,256,495 B2
(45) Date of Patent: Sep. 4, 2012

(54) ELECTRONIC APPARATUS INCLUDING REMOVABLE DUST CATCHER

(75) Inventors: Masahiko Hattori, Kawasaki (JP); Masuo Ohnishi, Kawasaki (JP); Tadanori Tachikawa, Kawasaki (JP); Masatoshi Nishizawa, Kawasaki (JP); Tomoki Harada, Kawasaki (JP); Goro Nakagai, Kawasaki (JP); Toyohiro Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1545 days.

(21) Appl. No.: 11/445,313

(22) Filed: Jun. 2, 2006

(65) Prior Publication Data

US 2007/0131383 A1   Jun. 14, 2007

(30) Foreign Application Priority Data

Dec. 13, 2005 (JP) ................................. 2005-359465
Mar. 9, 2006 (JP) ................................. 2006-064364

(51) Int. Cl.
*F22B 37/00* (2006.01)
*F28F 7/00* (2006.01)
*F28F 27/00* (2006.01)
*F24H 3/06* (2006.01)

(52) U.S. Cl. ..... 165/11.1; 165/11.2; 165/200; 165/80.2; 165/80.3; 165/122; 454/184; 361/695; 55/385.6

(58) Field of Classification Search ............... 165/11.1, 165/11.2, 200, 80.2, 80.4, 121, 122, 80.3; 361/695, 479.49; 454/184; 55/385.6
See application file for complete search history.

(56) References Cited

U.S. PATENT DOCUMENTS

| | | | | |
|---|---|---|---|---|
| 3,971,877 A | * | 7/1976 | Lee | 55/491 |
| 4,237,521 A | * | 12/1980 | Denker | 165/122 |
| 4,751,872 A | * | 6/1988 | Lawson, Jr. | 454/184 |
| 5,462,569 A | * | 10/1995 | Benjamin | 55/385.6 |
| 5,514,036 A | | 5/1996 | Lin | |
| 5,673,029 A | * | 9/1997 | Behl et al. | 340/635 |
| 5,766,285 A | * | 6/1998 | Killman | 55/385.6 |
| 5,835,786 A | * | 11/1998 | Brown et al. | 454/184 |
| 5,886,296 A | * | 3/1999 | Ghorbani et al. | 174/50 |
| 5,886,870 A | | 3/1999 | Omori | |
| 5,927,386 A | * | 7/1999 | Lin | 165/121 |
| 5,935,282 A | * | 8/1999 | Lin | 55/385.6 |

(Continued)

FOREIGN PATENT DOCUMENTS

JP    5-101633    4/1993

(Continued)

OTHER PUBLICATIONS

Office Action issued in corresponding Korean Patent Application No. 10-2006-0054265, mailed on Oct. 9, 2007.

(Continued)

*Primary Examiner* — Ljiljana Ciric
(74) *Attorney, Agent, or Firm* — Fujitsu Patent Center (57) ABSTRACT

A fan is enclosed in the enclosure of an electronic apparatus. The fan discharges air out of a ventilation opening of the fan. Heat radiating fins are located in an air passage extending from the ventilation opening. A dust catcher is removably mounted on an outside surface of the enclosure into an opening of the enclosure. The dust catcher is located in the air passage between the heat radiating fins and the ventilation opening. The dust catcher serves to catch the dust in the air passage. The dust catcher is removed from the enclosure along with the dust.

19 Claims, 9 Drawing Sheets

U.S. PATENT DOCUMENTS

| | | | |
|---|---|---|---|
| 6,023,144 | A | 2/2000 | Imai et al. |
| 6,104,607 | A | 8/2000 | Rehl |
| 6,118,654 | A | 9/2000 | Bhatia |
| 6,168,396 | B1* | 1/2001 | Homola .................. 417/53 |
| 6,241,478 | B1* | 6/2001 | Cichetti et al. .......... 417/63 |
| 6,297,950 | B1* | 10/2001 | Erwin .................. 361/679.49 |
| 6,406,257 | B1* | 6/2002 | Houdek ................ 454/184 |
| 6,421,238 | B1* | 7/2002 | Negishi ................ 361/695 |
| 6,439,992 | B1* | 8/2002 | Demeter ................ 454/184 |
| 6,483,701 | B1* | 11/2002 | Ta et al. ............... 361/695 |
| 6,746,502 | B2* | 6/2004 | Yair et al. ............. 454/184 |
| 7,068,506 | B2* | 6/2006 | Behl ................... 454/184 |
| 7,323,027 | B1* | 1/2008 | Fu .................... 55/385.6 |
| 7,466,545 | B2* | 12/2008 | Hung ................... 454/184 |
| 2002/0101714 | A1 | 8/2002 | Osecky et al. |
| 2002/0160742 | A1 | 10/2002 | Hasegawa et al. |
| 2003/0024683 | A1 | 2/2003 | Nagai et al. |
| 2004/0123978 | A1 | 7/2004 | Hashimoto et al. |
| 2006/0039113 | A1 | 2/2006 | Cheng et al. |
| 2009/0009967 | A1* | 1/2009 | Nishizawa et al. ....... 361/695 |

FOREIGN PATENT DOCUMENTS

| | | |
|---|---|---|
| JP | 7-321487 | 12/1995 |
| JP | 8-162789 | 6/1996 |
| JP | 9-36577 | 2/1997 |
| JP | 2599961 | 7/1999 |
| JP | 2000-153121 | 6/2000 |
| JP | 2002-26557 | 1/2002 |
| JP | 2002-43489 | 2/2002 |
| JP | 2002-62589 | 2/2002 |
| JP | 2004-111690 | 4/2004 |
| JP | 2004-263989 | 9/2004 |
| JP | 2005-4675 | 1/2005 |
| KR | 2003-0048661 | 6/2003 |
| TW | M270405 | 7/2005 |
| WO | 02/103505 A2 | 12/2002 |
| WO | 03/102746 A2 | 12/2003 |

OTHER PUBLICATIONS

European Search Report dated Nov. 3, 2009 issued in corresponding European Patent Application 06252740.3.

Chinese Office Action issued on Feb. 6, 2009 in corresponding Chinese Patent Application 2006100918822.

* cited by examiner

ELECTRONIC APPARATUS INCLUDING REMOVABLE DUST CATCHER

BACKGROUND OF THE INVENTION

1. Field of the Invention

The present invention relates to an electronic apparatus such as a notebook personal computer. In particular, the invention relates to an electronic apparatus comprising: a fan discharging air out of a ventilation opening of the fan; and a heat radiating fin or fins located in an air passage extending from the ventilation opening of the fan.

2. Description of the Prior Art

A fan is often enclosed in the enclosure of a notebook personal computer, for example. The fan generates airflow toward an air outlet defined in the enclosure. Heat radiating fins are located in an air passage extending from the ventilation opening of the fan. A heat pipe is coupled to the heat radiating fins. The heat pipe serves to transfer heat of a central processing unit, CPU, to the heat radiating fins, for example. The airflow in the air passage serves to absorb the heat from the heat radiating fins. The airflow having the heat is then discharged out of the enclosure through the air outlet.

The airflow contains dust. The dust sticks to the heat radiating fins. The cumulated dust can block the air passage. The airflow is thus obstructed. This results in a reduced radiation of heat from the heat radiating fins. The temperature of CPU thus inevitably rises. The rise in the temperature of the CPU causes a failure in the normal operation of the CPU.

SUMMARY OF THE INVENTION

It is accordingly an object of the present invention to provide an electronic apparatus contributing to the maintenance of an efficient radiation of heat from a heat radiating fin or fins. It is also an object of the present invention to provide a component, a dust catcher, and the like, significantly contributing to realization of such an electronic apparatus.

According to a first aspect of the present invention, there is provided an electronic apparatus comprising: an enclosure; a fan enclosed in the enclosure, the fan discharging air out of a ventilation opening of the fan itself; a heat radiating fin or fins enclosed in the enclosure, the heat radiating fin or fins located in an air passage extending from the ventilation opening; an opening defined in the enclosure; and a dust catcher removably mounted in the opening from the outside of the enclosure, the dust catcher located in the air passage between the heat radiating fin or fins and the ventilation opening.

The electronic apparatus allows the fan to establish airflow discharged from the ventilation opening. The airflow flows along the air passage. The airflow is in this manner strongly discharged into the outside of the enclosure. The heat radiating fin or fins is allowed to radiate heat in an efficient manner.

Dust enters the enclosure through any gaps. The dust is caught in the airflow discharged from the ventilation opening. The dust catcher serves to catch the dust in the air passage. In this case, the dust catcher can be removed from the enclosure. The dust catcher holds the dust during the removal. The dust is thus removed from the air passage along with the dust catcher. The dust is thus reliably cleared from the air passage. The dust catcher can then be cleaned. The cleaned dust catcher can again be set in the opening of the enclosure. Airflow of a sufficient amount is in this manner always kept in the air passage. The heat radiating fin or fins is prevented from suffering from the cumulation of dust. Heat is thus radiated from the heat radiating fin or fins in an efficient manner.

The dust catcher may comprise: a frame mounted in the opening; and parallel members located inside the frame so as to form a grating within the frame. The air passage can be established between the adjacent ones of the parallel members. Fine dusts and short dusts are allowed to pass by the parallel members and the heat radiating fin or fins. Long dusts can be captured on the parallel members. The long dusts stepwise cumulate on the parallel members as time elapses. The dust catcher can be removed from the enclosure as described above. The long dusts can be removed from the air passage. The cleaned dust catcher is again set in the opening of the enclosure. Airflow of a sufficient amount is in this manner kept in the air passage.

The electronic apparatus may further comprise hook members formed on the frame. In this case, the hook members may protrude from the frame toward the heat radiating fin or fins. The electronic apparatus may allow the users to hook the frame with a nail or finger when the users intend to remove the dust catcher, for example. This results in an inclining movement of the frame. The hook members are thus allowed to contact with the heat radiating fin or fins. When the dust catcher is subsequently withdrawn from the opening, the hook members keep sliding along the heat radiating fin or fins. The hook members thus catch the dust cumulated on the heat radiating fin or fins. The dust can in this manner be cleared off the heat radiating fin or fins. Airflow of a sufficient amount is in this manner kept in the air passage.

An asperity may be established on the surfaces of the parallel members. Alternatively, tackiness may be added to the surfaces of the parallel members. The asperity or the tackiness allows the parallel members to catch the dust in a facilitated manner.

The electronic apparatus may further comprise: a rotation speed detector circuit connected to the fan, the rotation speed detector circuit detecting the actual rotation speed of a rotor of the fan; a deviation detector circuit detecting a deviation between the actual rotation speed and a designated rotation speed specified in a control signal supplied to the fan, the deviation detector circuit outputting a predetermined signal when the actual rotation speed exceeds the designated rotation speed by a predetermined deviation; and a display device displaying predetermined information in response to the reception of the predetermined signal supplied from the deviation detector circuit. In this case, a centrifugal fan is employed as the fan.

The inventors have revealed that the actual rotation speed of the rotor in the fan made of a centrifugal fan exceeds the designated rotation speed if a larger amount of dust cumulates at the dust catcher. The electronic apparatus allows the actual rotation speed of the rotor to exceed the designated rotation speed if dust sufficiently cumulates at the dust catcher. The cumulation of dust can in this manner be detected in a facilitated manner. When the actual rotation speed exceeds the designated rotation speed by the predetermined deviation, the deviation detector circuit outputs the predetermined signal. The display device serves to display the predetermined information in response to the reception of the predetermined signal. The users of the electronic apparatus are in this manner recommended to remove the dust catcher. The users are notified of the optimal time for cleaning.

According to a second aspect of the present invention, there is provided an electronic apparatus comprising: an enclosure; a fan enclosed in the enclosure, the fan discharging air out of the enclosure; a heat radiating fin or fins enclosed in the enclosure, the heat radiating fin or fins located in an air passage for airflow supplied from the fan; an opening defined in the enclosure; and a dust catcher removably mounted in the opening from the outside of the enclosure, the dust catcher located in the air passage between the heat radiating fin or fins and the fan.

As described above, dust enters the enclosure through any gaps. The dust is caught in the airflow supplied from the fan. The dust catcher serves to catch the dust in the air passage. In this case, the dust catcher can be removed from the enclosure. The dust catcher holds the dust during the removal. The dust is thus removed from the air passage along with the dust catcher. The dust is thus reliably cleared from the air passage. The dust catcher can then be cleaned. The cleaned dust catcher can again be set in the opening of the enclosure. Airflow of a sufficient amount is in this manner always kept in the air passage. The heat radiating fin or fins is prevented from suffering from the cumulation of dust. Heat is thus radiated from the heat radiating fin or fins in an efficient manner.

The dust catcher may include a pectination having parallel plates extending along an extension or extensions of the heat radiating fin or fins. Air passages can be established between the adjacent ones of the parallel plates. Fine dusts and short dusts are allowed to pass by the parallel plates and the heat radiating fin or fins. Long dusts can be captured on the pectination. The long dusts stepwise cumulate on the parallel members as time elapses. The dust catcher can be removed from the enclosure as described above. The long dusts can be removed from the air passage. The cleaned dust catcher is again set in the opening of the enclosure. Airflow of a sufficient amount is in this manner kept in the air passage. An asperity may be established on the surface of the dust catcher. Alternatively, tackiness may be added to the surface of the dust catcher.

The electronic apparatus may further comprise: a rotation speed detector circuit connected to the fan, the rotation speed detector circuit detecting the actual rotation speed of a rotor of the fan; a deviation detector circuit detecting a deviation between the actual rotation speed and a designated rotation speed specified in a control signal supplied to the fan, the deviation detector circuit outputting a predetermined signal when the actual rotation speed exceeds the designated rotation speed by a predetermined deviation; and a display device displaying predetermined information in response to the reception of the predetermined signal supplied from the deviation detector circuit. In this case, a centrifugal fan is employed as the fan. The users are notified of the optimal time for cleaning in the same manner as described above.

A predetermined component may be provided to realize the aforementioned electronic apparatus. The predetermined component may comprise: a fan enclosed in the enclosure of an electronic apparatus, the fan discharging air out of the enclosure; a heat radiating fin or fins enclosed in the enclosure, the heat radiating fin or fins located in an air passage for airflow supplied from the fan; and a dust catcher removably mounted in an opening defined in the enclosure from the outside of the enclosure, the dust catcher located in the air passage between the heat radiating fin or fins and the fan. The component of the type significantly contributes to realization of the aforementioned electronic apparatus.

Likewise, a predetermined dust catcher may be provided to realize the aforementioned electronic apparatus. The predetermined dust catcher may be designed to fit to an electronic apparatus comprising: an enclosure; a fan enclosed in the enclosure, the fan discharging air out of the enclosure; and a heat radiating fin or fins enclosed in the enclosure, the heat radiating fin or fins located in an air passage for airflow supplied from the fan. The dust catcher may removably be mounted in an opening defined in the enclosure from outside of the enclosure. The dust catcher may be located in the air passage between the heat radiating fin or fins and the fan. The dust catcher of the type significantly contributes to realization of the aforementioned electronic apparatus.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
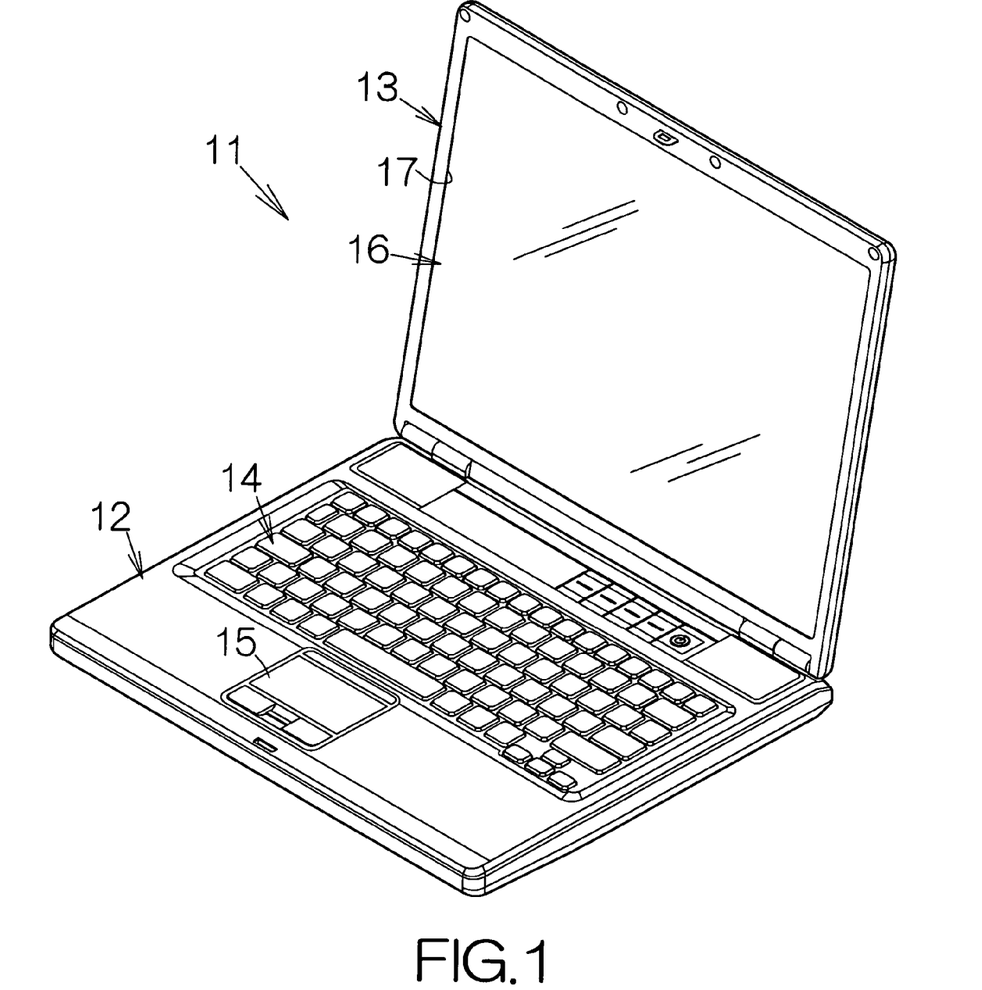
FIG. 1 is a perspective view schematically illustrating a notebook personal computer as a specific example of an electronic apparatus according to the present invention.

FIG. 1 schematically illustrates a notebook personal computer 11 as a specific example of an electronic apparatus according to the present invention. The notebook personal computer 11 includes a thin main body 12 and a display enclosure 13 pivotably coupled to the main body 12. Input devices such as a keyboard 14 and a pointing device 15 are embedded in the front surface of the main body 12. Users manipulate the keyboard 14 and/or the pointing device 15 to input commands and/or data.

A display device such as a liquid crystal display (LCD) panel module 16 is enclosed in the display enclosure 13, for example. The screen of the LCD panel module 16 gets exposed in a window opening 17 defined in the display enclosure 13. Text data and graphics are displayed on the screen. Users can see the ongoing operation of the notebook personal computer 11 based on the displayed text data and graphics. The display enclosure 13 can be superimposed on the main body 12 through a pivotal movement relative to the main body 12.

Figure 2:
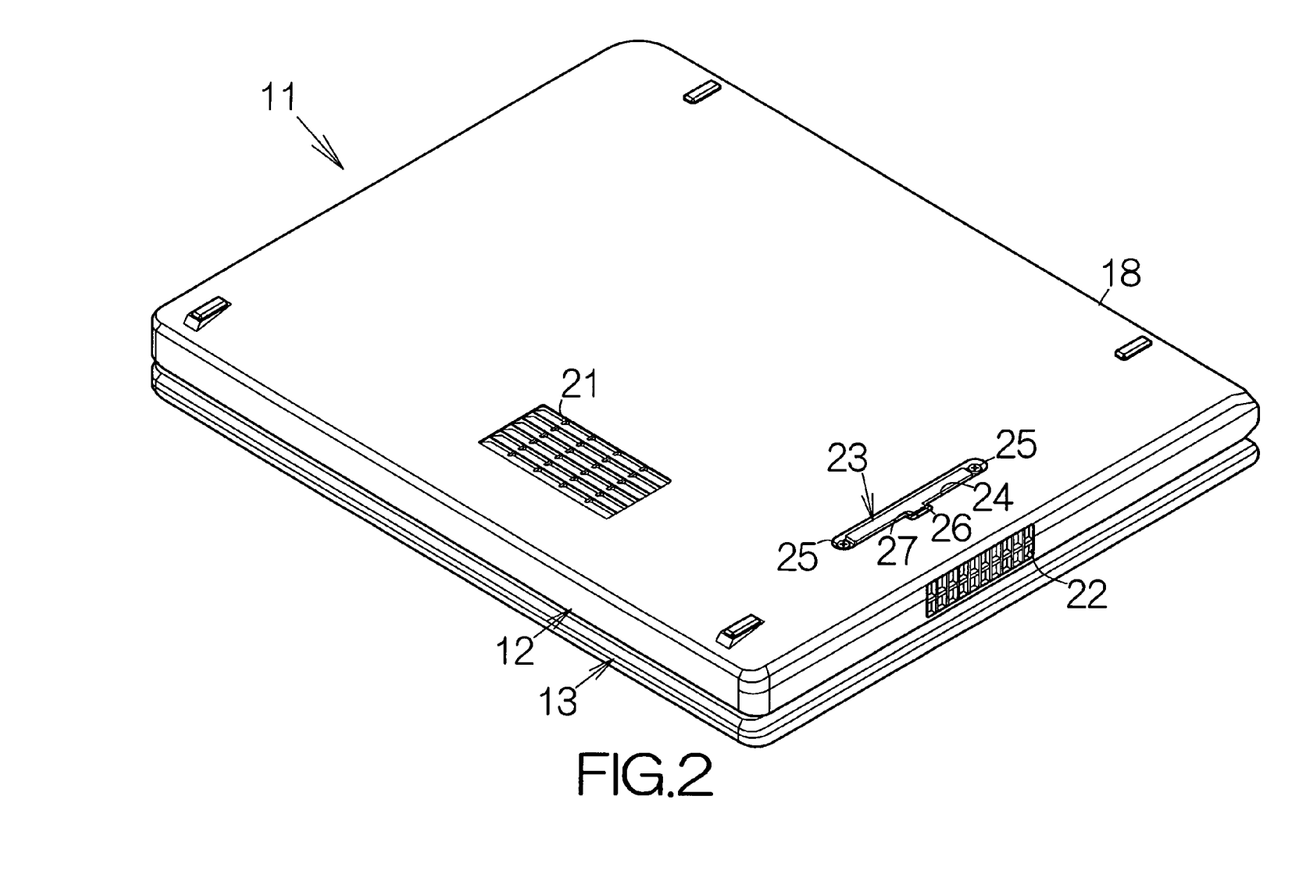
FIG. 2 is a perspective view schematically illustrating the bottom surface of a main body.

As shown in FIG. 2, an air inlet 21 and an air outlet 22 are defined in the enclosure 18 of the main body 12. The air inlet 21 may be defined in the bottom plate of the enclosure 18, for example. The air outlet 22 may be defined in the side wall standing upright from the outer periphery of the bottom plate of the enclosure 18, for example. Fresh air is introduced through the air inlet 21 into the inner space of the enclosure 18 from the outer space of the enclosure 18. Air is discharged through the air outlet 22 from the inner space of the enclosure 18 into the outer space of the enclosure 18. When the notebook personal computer 11 is set on a desk, the bottom plate is usually opposed to the upper surface of the desk. The air outlet 22 is thus prevented from being blocked.

A dust catcher 23 is removably mounted in the bottom plate of the enclosure 18 from the outside of the enclosure 18. An opening or slot 24 is defined in the bottom plate of the enclosure 18 for receiving the dust catcher 23. The dust catcher 23 is inserted into the inner space of the enclosure 18 through the slot 24. The dust catcher 23 is fixed to the bottom plate of the enclosure 18. A pair of screws 25 is utilized to fix the dust catcher 23, for example. The screws 25 are screwed into the bottom plate of the enclosure 18.

The dust catcher 23 includes a lug 26. The lug 26 is held in a depression 27 defined in the bottom plate of the enclosure 18. The depression 27 is formed continuous to the slot 24. Users can hook the lug 26 with a finger when they intend to remove the dust catcher 23, for example. The dust catcher 23 will be described later in detail.

Figure 3:
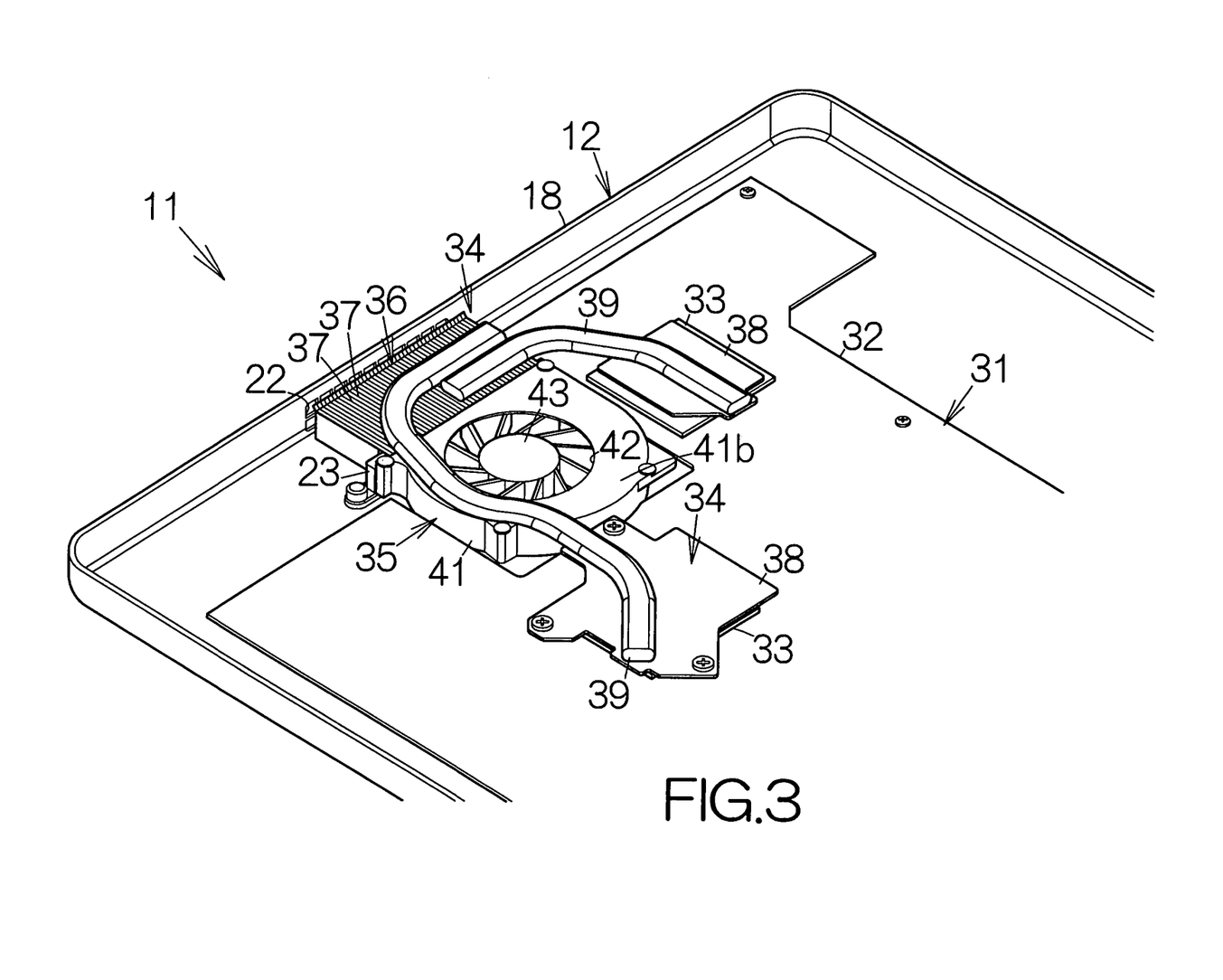
FIG. 3 is an enlarged partial perspective view schematically illustrating the inner structure of the main body.

As shown in FIG. 3, a printed circuit board unit 31 is enclosed in the enclosure 18 of the main body 12. The printed circuit board unit 31 includes a printed wiring board 32 and large-scale integrated circuit (LSI) packages 33, 33 mounted on the surface of the printed wiring board 32. The individual LSI package 33 includes a central processing unit (CPU) chip or a video chip, both not shown, mounted on a small-sized ceramic substrate, for example. The CPU chip executes various kinds of processing based on an operating system (OS) and application software, for example. The video chip executes various kinds of image processing in response to the instructions from the CPU chip, for example.

A cooling apparatus 34 is coupled to the LSI packages 33. The cooling apparatus 34 includes a fan unit 35. A heat radiating fin member 36 is located in a space between the fan unit 35 and the air outlet 22. The heat radiating fin member 36 includes heat radiating fins 37 extending in parallel with one another. Air passages are defined between individual adjacent ones of the heat radiating fins 37. The fan unit 35 serves to generate airflow running through the air passages to the air outlet 22. The airflow serves to discharge heat of the heat radiating fins 37 out of the enclosure 18.

Heat conductive plates 38 are respectively superimposed on the CPU chip and the video chip. A heat conductive member or heat pipe 39 is utilized to connect the individual heat conductive plate 38 and the heat radiating fins 37. The heat pipe 39 transfers heat from the heat conductive plate 38 to the heat radiating fins 37. The heat conductive plates 38 are designed to receive heat from the CPU chip and the video chip.

The fan unit 35 includes a fan housing 41. The fan housing 41 defines a predetermined inner space. Air suction openings 42, only one shown, are formed in the fan housing 41. The air suction openings 42 serve to connect the inner space to the outside of the fan housing 41. A fan 43 is enclosed in the fan housing 41.

Figure 4:
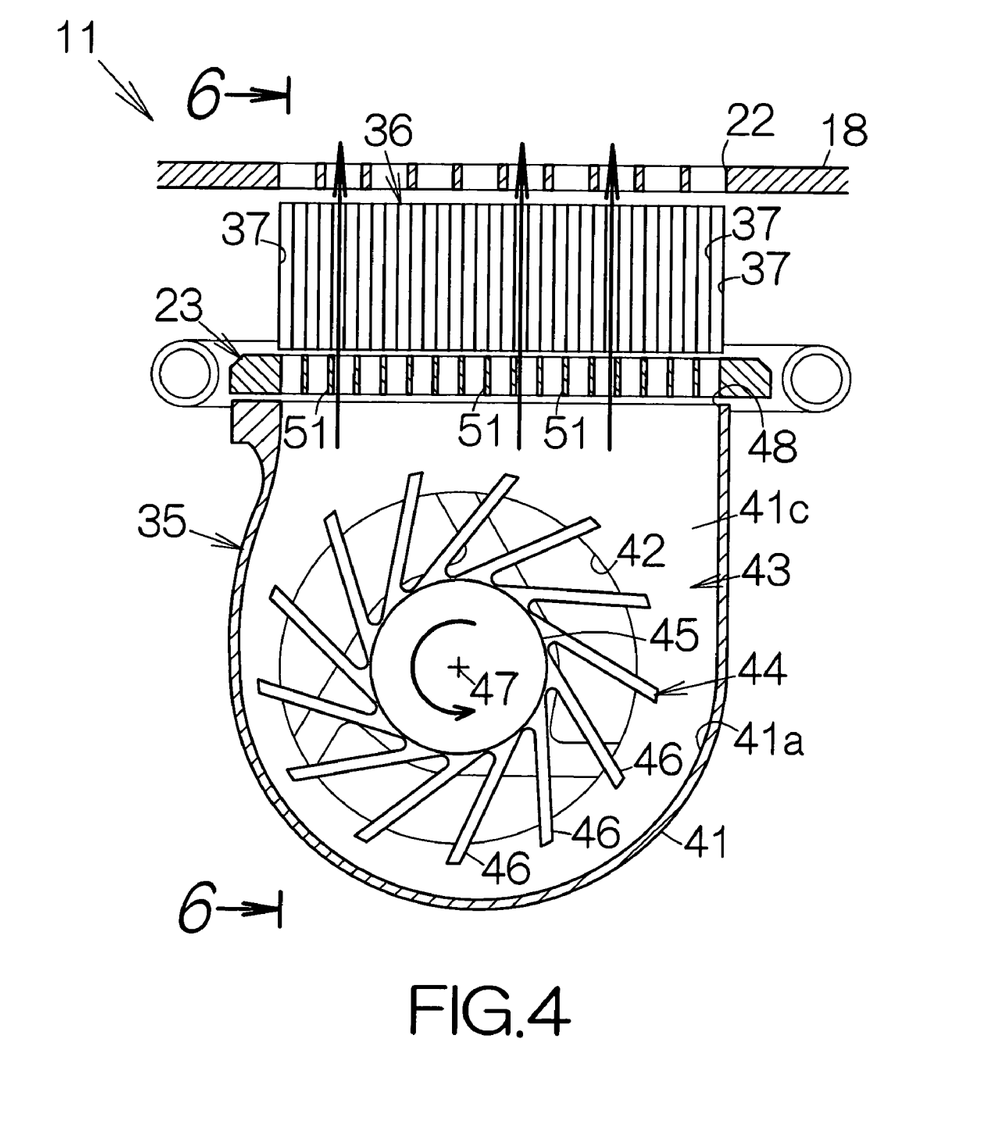
FIG. 4 is an enlarged plan view schematically illustrating the structure of a cooling apparatus.

As shown in FIG. 4, a so-called centrifugal fan is employed as the fan 43. The fan 43 includes a rotor 44. The rotor 44 includes a rotating body 45 and blades 46 extending in the radial or centrifugal directions from the rotating body 45 around the rotating body 45. When the rotor 44 is driven to rotate around the rotation axis 47, air is introduced along the rotation axis 47 through the air suction openings 42. The rotation of the blades 46 generates airflow in the centrifugal direction.

The fan housing 41 defines a surrounding side wall 41a, a top plate 41b (shown in FIG. 3) and a bottom plate 41c. The surrounding side wall 41a is located at a position outside the rotor 44 in the centrifugal direction. The top plate 41b and the bottom plate 41c are coupled to the upper and lower ends of the surrounding side wall 41a, respectively. The inward surface of the surrounding side wall 41a is opposed to the outer ends of the blades 46 of the rotor 44. The air suction opening 42 is defined in each of the top plate 41b and the bottom plate 41c. The surrounding side wall 41a has a gap for defining a ventilation opening 48 between the top plate 41b and the bottom plate 41c. The ventilation opening 48 is located at a position outside the rotor 44 in the centrifugal direction.

The ventilation opening 48 is opposed to the heat radiating fin member 36 at a distance. The centrifugal airflow is guided to the ventilation opening 48 along the inward surface of the surrounding side wall 41a. The airflow is then discharged through the ventilation opening 48. The heat radiating fin member 36 serves to guide the airflow to the air outlet 22. In other words, the heat radiating fin member 36 defines an air passage extending from the ventilation opening 48 to the air outlet 22. The heat radiating fins 37 are located within the air passage.

As is apparent from FIG. 4, the dust catcher 23 is located within the air passage between the ventilation opening 48 or fan 43 and the heat radiating fins 37. The dust catcher 23 includes parallel members 51 located at positions adjacent to the upstream edges of the heat radiating fins 37. The parallel members 51 may be small plates extending in parallel with one another. The parallel members 51 are designed to extend along imaginary planes including the heat radiating fins 37. The downstream edges of the parallel members 51 may be continuous with the upstream edges of the corresponding heat radiating fins 37. At least the upstream edges of the heat radiating fins 37 are hidden from the airflow behind the parallel members 51. Here, the parallel members 51 serve as a pectination of the present invention. The heat radiating fin member 36, the fan 43 and the dust catcher 23 in combination serve as a component of the present invention.

The number of parallel members 51 may depend on the thickness of the individual parallel member 51. Additionally, the number of parallel members 51 may also depend on the size of pieces of captured dust, the amount of airflow for sufficiently cooling the heat radiating fins 37, or the like. Here, the parallel members 51 are assigned to every other heat radiating fin 37. The spaces between the parallel members 51 are thus set wider or larger than the spaces between the heat radiating fins 37. A relatively large-sized trash such as a piece of thread can be attached to the parallel members 51. Such a trash is prevented from getting into the heat radiating fin member 36. Simultaneously, a relatively small-sized trash such as dust can pass through the spaces between the parallel members 51 as well as the spaces between the heat radiating fins 37. Such a trash is discharged out of the air outlet 22.

Figure 5:
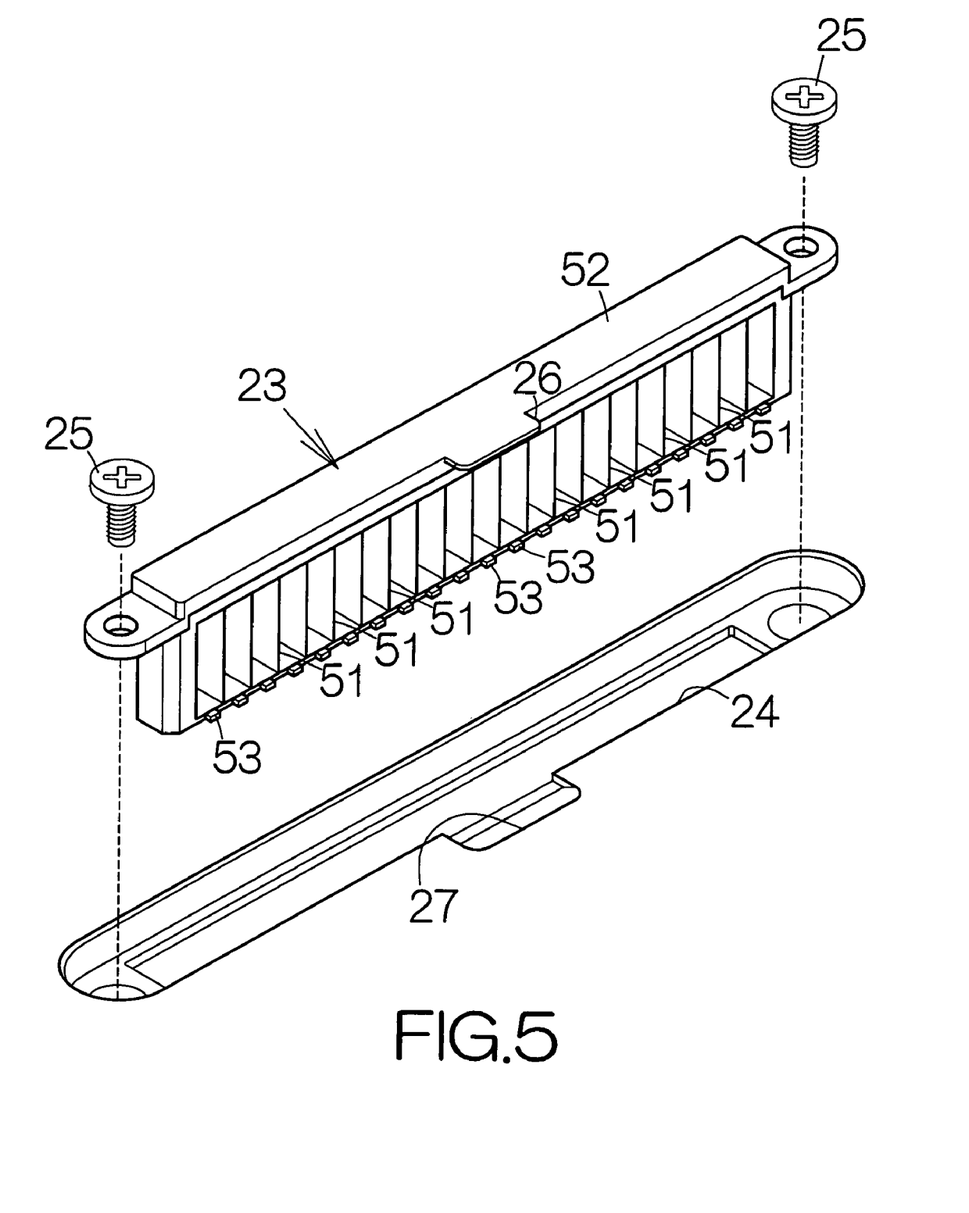
FIG. 5 is an enlarged perspective view schematically illustrating the structure of a dust catcher.

As shown in FIG. 5, the dust catcher 23 includes a frame 52 holding the parallel members 51. The parallel members 51 and the frame 52 in combination thus forms a grating. The frame 52 defines an air passage in a space between the ventilation opening 48 and the heat radiating fin member 36. The parallel members 51 are located within the air passage. The frame 52 and the parallel members 51 may be formed in a one piece component made of a resin material, for example. Molding process may be employed to form such a one piece component, for example.

Here, asperity may be established on the upstream edges of the parallel members 51. A number of particles may be adhered to the surfaces of the parallel members 51 for establishing the asperity. Alternatively, a mold for forming the parallel members 51 may have an asperity, reflecting an asperity of the parallel members 51, on the inward surface of the cavity. Otherwise, the surfaces of the parallel members 51 may be subjected to abrasion with sandpaper, for example. A light tackiness may be added to the surfaces of the parallel members 51 instead of the asperity. A coating film serves to establish the light tackiness, for example.

Hook members 53 may be formed on the frame 52. The hook members 53 are designed to protrude downstream from the frame 52. The hook members 53 may be located in the intermediate positions between adjacent ones of the parallel members 51, respectively. The individual hook member 53 may be formed in the shape of a small parallelepiped, for example. The hook members 53 may be formed integral with the frame 52 based on molding. Asperity may also be established on the surfaces of the hook members 53.

Figure 6:
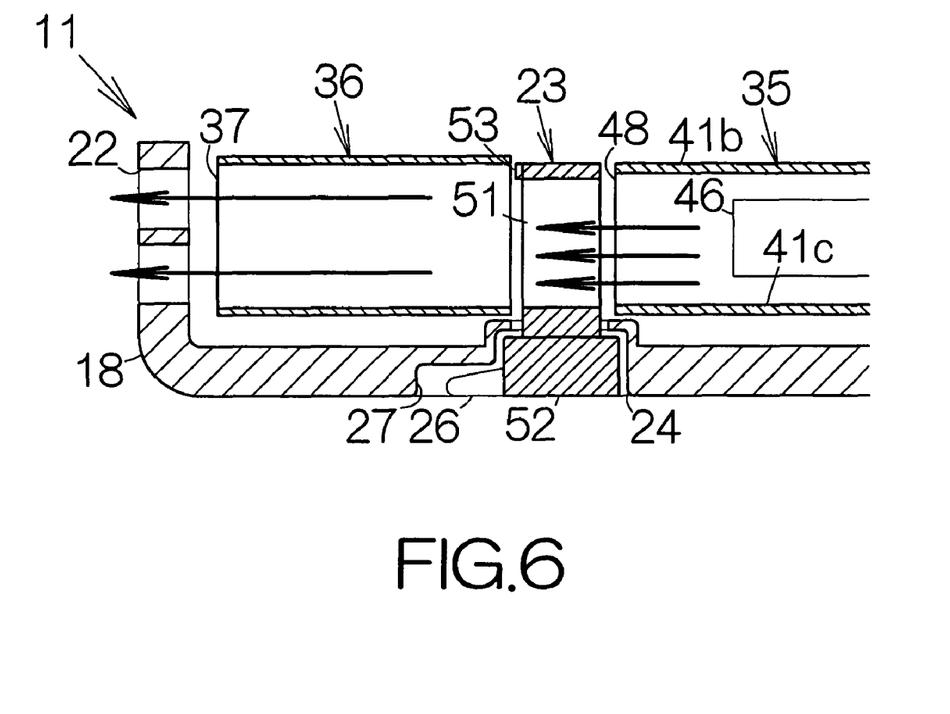
FIG. 6 is an enlarged partial sectional view taken along the line 6-6 in FIG. 4.

As shown in FIG. 6, when the dust catcher 23 is inserted into the slot 24 from the outside of the enclosure 18, the dust catcher 23 and the heat radiating fin member 36 in combination establish the air passage between the ventilation opening 48 and the air outlet 22. Airflow is discharged through the ventilation opening 48 in response to the supply of electric power to the fan 43. The discharged airflow is guided to the air outlet 22 along the air passage. The airflow is in this manner discharged out of the air outlet 22. Heat can be removed from the heat radiating fins 37 with a higher efficiency. Although the parallel members 51 have a thickness larger than that of the heat radiating fins 37, the heat radiating fins 37 can enjoy a sufficient amount of airflow because sufficient spaces are established between the parallel members 51.

Figure 7:
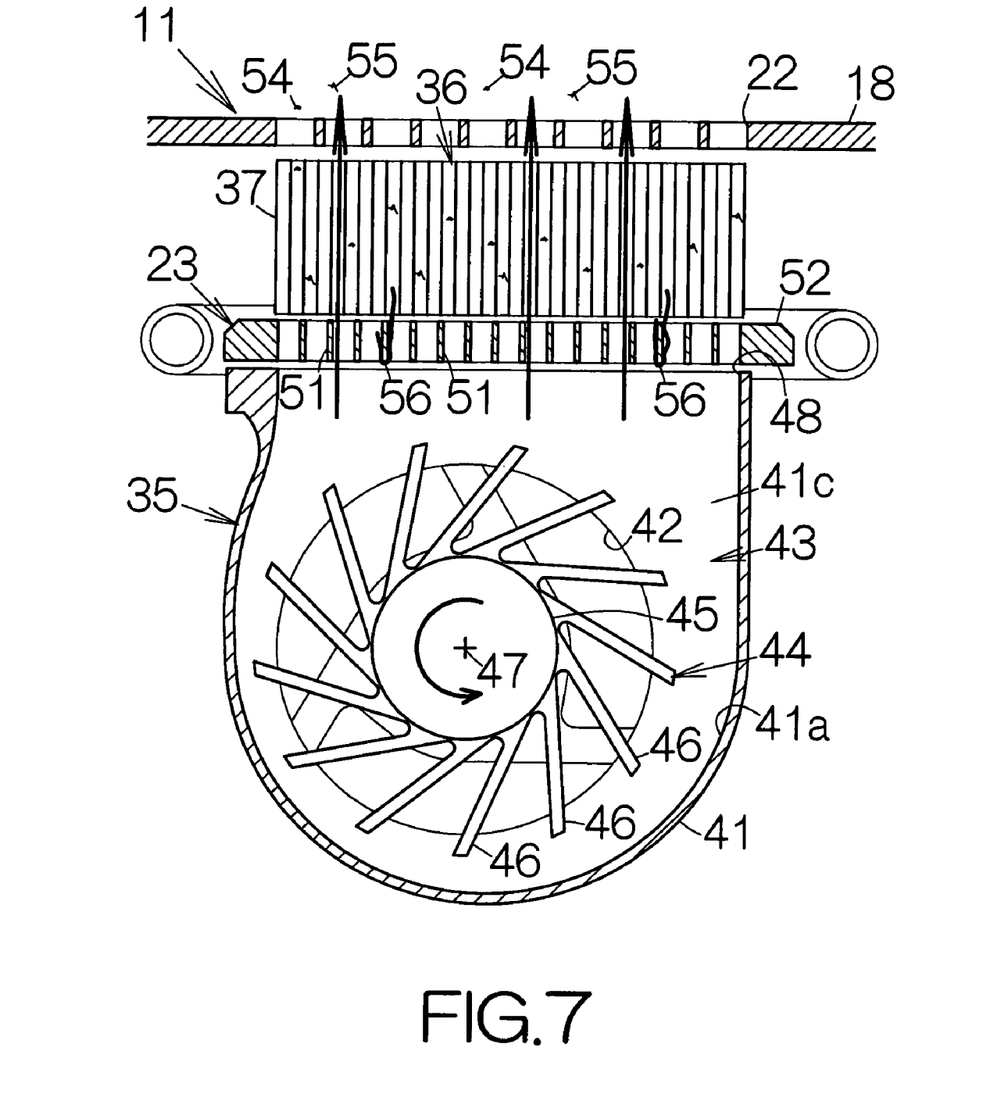
FIG. 7 is an enlarged plan view, corresponding to FIG. 4, for schematically illustrating the cooling apparatus in operation.

The fan unit 35 serves to suck air within the entire space of the enclosure 18. Dust enters the enclosure 18 through not only the air inlet 21 but also any gaps of the enclosure 18. Such dust can be caught in the airflow discharged from the ventilation opening 48 of the fan unit 35. As shown in FIG. 7, fine dusts 54 and short dusts 55 can pass through the dust catcher 23 and the heat radiating fin member 36. The fine dusts 54 and the short dusts 55 are then discharged out of the air outlet 22. On the other hand, long dusts 56 are captured at the upstream edges of the parallel members 51. The long dusts 56 stepwise cumulate on the parallel members 51 as time elapses.

The dust catcher 23 can be removed from the bottom plate of the enclosure 18 as described above. The dust catcher 23 holds the long dusts 56 on the parallel members 51 during the removal. The dusts 56 are thus removed from the air passage along with the dust catcher 23. The long dusts 56 are thus reliably cleared from the air passage. The dust catcher 23 can then be cleaned. The cleaned dust catcher 23 is again set in the bottom plate of the enclosure 18. Airflow of a sufficient amount is in this manner always kept in the air passage. Heat is thus radiated from the heat radiating fins 37 in an efficient manner.

Figure 8:
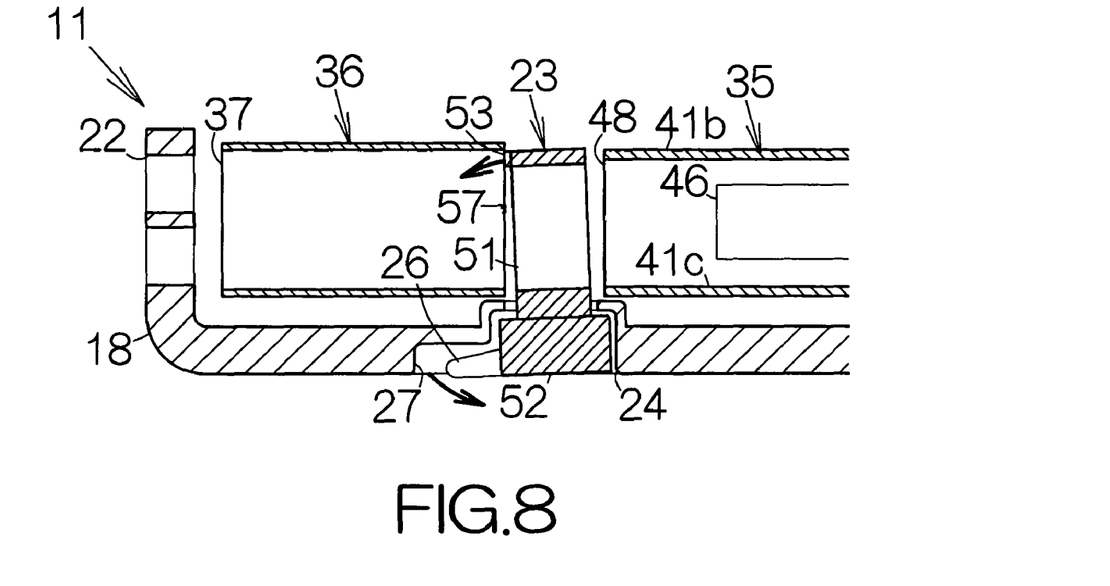
FIG. 8 is an enlarged partial sectional view, corresponding to FIG. 6, for schematically illustrating the removal of the dust catcher from the main body.

As shown in FIG. 8, users are allowed to hook the lug 26 with a nail or finger when the users intend to remove the dust catcher 23. The frame 52 thus receives a force from the tip or free end of the lug 26. This results in an inclining movement of the frame 52. The hook members 53 are thus brought into contact with the upstream edges of the heat radiating fins 37.

Figure 9:
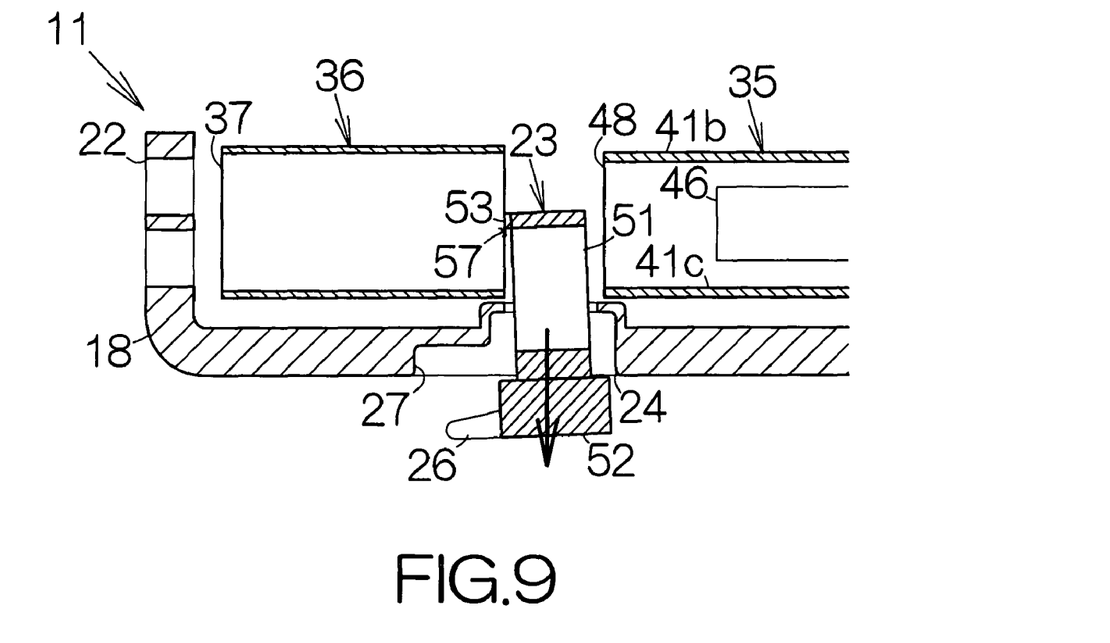
FIG. 9 is an enlarged partial sectional view, corresponding to FIG. 6, for schematically illustrating removal of the dust catcher from the main body.

When the dust catcher 23 is subsequently withdrawn from the slot 24, the hook members 53 keep sliding along the corresponding upstream edges of the heat radiating fins 37, as shown in FIG. 9. The hook members 53 catch the dusts 57 cumulated at the upstream edges of the heat radiating fins 37. The dusts 57 can in this manner be scraped off the upstream edges of the heat radiating fins 37. The dusts 57 can be removed away from the air passage. Airflow of a sufficient amount is in this manner always kept in the air passage.

Figure 10:
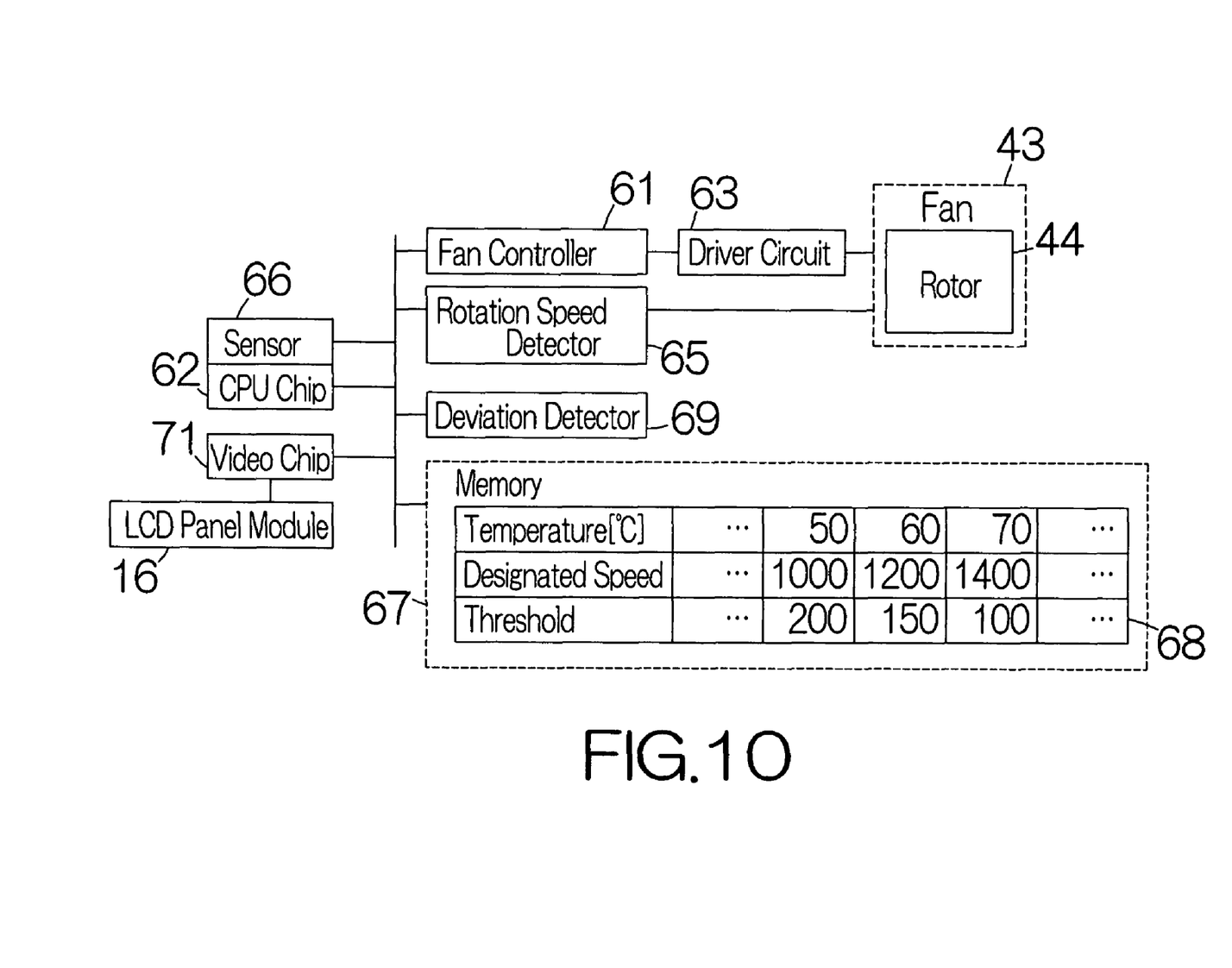
FIG. 10 is a block diagram schematically illustrating a control system of the notebook personal computer.

As shown in FIG. 10, the notebook personal computer 11 may include a fan controller circuit 61. The fan controller circuit 61 is designed to control the rotation speed of the rotor 44 of the fan 43 in accordance with the level of the temperature of the central processing unit (CPU) chip 62. A control signal is generated at the fan controller circuit 61 for controlling the rotation speed. A designated rotation speed of the rotor 44 is specified in the control signal.

A driver circuit 63 is connected to the fan controller circuit 61. An electric motor of the fan 43 is connected to the driver circuit 63. The driver circuit 63 is designed to control the electric motor based on the duty ratio and/or the voltage value. The drive circuit 63 generates a drive signal based on the control signal from the fan controller circuit 61. The drive signal reflects the designated rotation speed specified in the control signal. The fan 43 in this manner generates airflow through the rotation of the rotor 44.

A rotation speed detector circuit 65 such as an encoder is connected to the fan controller circuit 61. The rotation speed detector circuit 65 is designed to detect the actual rotation speed of the rotor 44. A rotation speed information signal is generated in the rotation speed detector circuit 65. The actual rotation speed of the rotor 44 is specified in the rotation speed information signal.

A temperature sensor 66 is connected to the fan controller circuit 61. The temperature sensor 66 is designed to detect the temperature of the CPU chip 62, for example. The temperature sensor 66 may be embedded within the CPU chip 62. The temperature sensor 66 supplies a temperature information signal to the fan controller circuit 61. The temperature of the CPU chip 62 is specified in the temperature information signal.

A storage circuit such as a memory 67 is connected to the fan controller circuit 61. A data table 68 is established in the memory 67. The data table 68 holds values of a designated rotation speed and a threshold of the rotor 44 for various temperatures of the CPU chip 62. The fan controller circuit 61 selects a designated rotation speed in the data table 68 in accordance with the temperature of the CPU chip 62.

A deviation detector circuit 69 is connected to the fan controller circuit 61. The deviation detector circuit 69 is designed to detect whether or not the actual rotation speed is faster than the selected designated rotation speed. The deviation detector circuit 69 is designed to calculate the deviation or difference between the designated rotation speed and the actual rotation speed. The control signal may be supplied to the deviation detector circuit 69 from the fan controller circuit 61 for specifying the designated rotation speed. Alternatively, the deviation detector circuit 69 may read the designated rotation speed in the data table 68 based on the temperature information signal. The actual rotation speed may be obtained based on the rotation speed information signal. The deviation detector circuit 69 obtain the corresponding threshold out of the data table 68 in accordance with the level of the temperature specified in the temperature information signal. The deviation between the designated rotation speed and the actual rotation speed is compared with the obtained corresponding threshold.

A video chip 71 is connected to the CPU chip 62. The aforementioned LCD panel module 16 is connected to the video chip 71. When the actual rotation speed deviates from the designated rotation speed by a predetermined amount, the deviation detector circuit 69 supplies a warning signal to the CPU chip 62. The CPU chip 62 executes processing in response to reception of the warning signal. The video chip 71 operates to display predetermined information on the screen of the LCD panel module 16 based on the calculation at the CPU chip 62.

The rotation of the rotor 44 is controlled in the fan 43. The fan controller circuit 61 detects the temperature of the CPU chip 62 in this case. The fan controller circuit 61 serves to write a designated rotation speed into the control signal based on the temperature information signal. The control signal causes the electric motor to drive the rotor 44 at the designated rotation speed. A rise in the temperature of the CPU chip 62 induces an increase in the rotation speed of the rotor 44. In this manner, the CPU chip 62 is prevented from suffering from a higher temperature.

The rotation speed detector circuit 65 detects the actual rotation speed of the rotor 44. The temperature information signal and the rotation speed information signal are supplied to the deviation detector circuit 69. The deviation detector circuit 69 specifies the designated rotation speed of the rotor 44 in accordance with the level of the temperature of the CPU chip 62. The deviation detector circuit 69 calculates the deviation between the designated rotation speed and the actual rotation speed. The calculated deviation is compared with the threshold.

When the actual rotation speed exceeds the designated rotation speed by a deviation equal to or larger than the threshold, for example, the predetermined warning signal is supplied to the CPU chip 62 from the deviation detector circuit 69. The CPU chip 62 executes processing in response to reception of the warning signal. The video chip 71 executes an image processing based on the calculation at the CPU chip 62. The CPU chip 62 operates to pop up a window of warning on the screen of the LCD panel module 16, for example. The user is recommended to remove the dust catcher 23 for cleaning. The user is in this manner notified of the optimal time for cleaning.

The inventors have revealed that the actual rotation speed of the rotor 44 in the fan 43 made of a centrifugal fan exceeds the designated rotation speed if a larger amount of dust cumulates at the dust catcher 23. The hard disk drive 11 allows the actual rotation speed of the rotor 44 to exceed the designated rotation speed if dust sufficiently cumulates at the dust catcher 23. The cumulation of dust can in this manner be detected in a facilitated manner. The occlusion of the ventilation opening 48 is reliably prevented.

The fan unit 35 may allow the CPU chip 62 to take over the processing at the deviation detector circuit 69. In this case, the CPU chip 62 may execute the processing based on a software program.

What is claimed is:

1. An electronic apparatus comprising:
   an enclosure configured with a dust collector opening;
   a heat generating component enclosed in the enclosure;
   a fan enclosed in the enclosure, the fan discharging air out of a ventilation opening of the fan;
   a heat radiating fin enclosed in the enclosure, the heat radiating fin located in an air passage extending from the ventilation opening, the heat radiating fin connected to the heat generating component; and
   a dust catcher removably mounted to an outside surface of the enclosure, at least a portion of the dust catcher being arranged within the dust collector opening and within the air passage between the heat radiating fin and the ventilation opening.

2. The electronic apparatus according to claim 1, wherein the dust catcher comprises:
   a frame; and
   parallel members located inside the frame so as to form a grating within the frame.

3. The electronic apparatus according to claim 2, further comprising hook members formed on the frame, the hook members protruding from the frame toward the heat radiating fin.

4. The electronic apparatus according to claim 2, further comprising asperity on a surface of the parallel members.

5. The electronic apparatus according to claim 2, wherein tackiness is added to surfaces of the parallel members.

6. The electronic apparatus according to claim 1, further comprising:
   a rotation speed detector circuit connected to the fan, the rotation speed detector circuit detecting an actual rotation speed of a rotor of the fan;
   a deviation detector circuit detecting a deviation between the actual rotation speed and a designated rotation speed specified in a control signal supplied to the fan, the deviation detector circuit outputting a predetermined signal when the actual rotation speed exceeds the designated rotation speed by a predetermined deviation; and
   a display device displaying predetermined information in response to reception of the predetermined signal supplied from the deviation detector circuit, wherein
   a centrifugal fan is employed as the fan.

7. An electronic apparatus comprising:
   an enclosure configured with a dust collector opening;
   a heat generating component enclosed in the enclosure;
   a fan enclosed in the enclosure, the fan discharging air out of the enclosure;
   a heat radiating fin enclosed in the enclosure, the heat radiating fin located in an air passage for airflow supplied from the fan, the heat radiating fin connected to the heat generating component; and
   a dust catcher removably mounted to an outside surface of the enclosure, at least a portion of the dust catcher being arranged within the dust collector opening and within the air passage between the heat radiating fin and the fan.

8. The electronic apparatus according to claim 7, wherein the dust catcher includes a pectination having parallel plates extending along an extension of the heat radiating fin.

9. The electronic apparatus according to claim 7, further comprising asperity on a surface of the dust catcher.

10. The electronic apparatus according to claim 7, wherein tackiness is added to a surface of the dust catcher.

11. The electronic apparatus according to claim 7, further comprising:
   a rotation speed detector circuit connected to the fan, the rotation speed detector circuit detecting an actual rotation speed of a rotor of the fan;
   a deviation detector circuit detecting a deviation between the actual rotation speed and a designated rotation speed specified in a control signal supplied to the fan, the deviation detector circuit outputting a predetermined signal when the actual rotation speed exceeds the designated rotation speed by a predetermined deviation; and
   a display device displaying predetermined information in response to reception of the predetermined signal supplied from the deviation detector circuit, wherein
   a centrifugal fan is employed as the fan.

12. A component comprising:
   a fan enclosed in an enclosure of an electronic apparatus, the fan discharging air out of the enclosure;
   a heat radiating fin enclosed in the enclosure, the heat radiating fin located in an air passage for airflow supplied from the fan, the heat radiating fin connected to a heat generating component enclosed in the enclosure; and a dust catcher removably mounted to an outside surface of the enclosure, at least a portion of the dust catcher being arranged within an opening defined in the enclosure and within the air passage between the heat radiating fin and the fan.

13. The component according to claim 12, wherein the dust catcher includes a pectination having parallel plates extending in parallel with the heat radiating fin.

14. The component according to claim 12, further comprising asperity on a surface of the dust catcher.

15. The component according to claim 12, wherein tackiness is added to a surface of the dust catcher.

16. A dust catcher utilized for an electronic apparatus, the electronic apparatus comprising:
- an enclosure;
- a heat generating component enclosed in the enclosure;
- a fan enclosed in the enclosure, the fan discharging air out of the enclosure; and
- a heat radiating fin enclosed in the enclosure, the heat radiating fin located in an air passage for airflow supplied from the fan, the heat radiating fin connected to the heat generating component, wherein
- the dust catcher is removably mounted to an outside surface of the enclosure, at least a portion of the dust catcher being arranged within an opening defined in the enclosure and within the air passage between the heat radiating fin and the fan.

17. The dust catcher according to claim 16, includes a pectination having parallel plates extending along an extension or extensions of the heat radiating fin.

18. The dust catcher according to claim 16, further comprising asperity on a surface of the dust catcher.

19. The dust catcher according to claim 16, wherein tackiness is added to a surface of the dust catcher.

* * * * *